(12) United States Patent
Koch et al.

(10) Patent No.: US 8,073,558 B2
(45) Date of Patent: Dec. 6, 2011

(54) CRITICAL RESOURCE NOTIFICATION SYSTEM AND INTERFACE DEVICE

(75) Inventors: Edward Lee Koch, San Rafael, CA (US); Daniel Allan Hennage, Mill Valley, CA (US); Wesley Clay Collier, Piedmont, CA (US)

(73) Assignee: Honeywell International Inc, Morristown, NJ (US)

( * ) Notice: Subject to any disclaimer, the term of this patent is extended or adjusted under 35 U.S.C. 154(b) by 391 days.

(21) Appl. No.: 12/245,560

(22) Filed: Oct. 3, 2008

(65) Prior Publication Data

US 2009/0092062 A1    Apr. 9, 2009

Related U.S. Application Data

(60) Provisional application No. 60/977,909, filed on Oct. 5, 2007.

(51) Int. Cl.
*G06F 19/00* (2011.01)

(52) U.S. Cl. .................. 700/94; 719/318; 709/231

(58) Field of Classification Search ............. 700/17, 700/94, 286, 291; 719/318; 709/231, 203; 714/49
See application file for complete search history.

(56) References Cited

U.S. PATENT DOCUMENTS

| | | | |
|---|---|---|---|
| 4,130,874 A | 12/1978 | Pai | |
| 5,572,438 A | 11/1996 | Ehlers et al. | |
| 5,598,349 A | 1/1997 | Elliason et al. | |
| 6,259,723 B1 | 7/2001 | Miyashita | |
| 6,519,509 B1 | 2/2003 | Nierlich et al. | |
| 6,529,723 B1 * | 3/2003 | Bentley | 455/405 |
| 6,574,581 B1 | 6/2003 | Bohrer et al. | |
| 6,865,685 B2 * | 3/2005 | Hammond et al. | 713/340 |
| 7,346,467 B2 | 3/2008 | Bohrer et al. | |

(Continued)

FOREIGN PATENT DOCUMENTS

WO    WO 2009/006133    1/2009

(Continued)

OTHER PUBLICATIONS

Mary Ann Piette, David Watson, Naoya Motegi and Sila Kiliccote. Automated Critical Peak Pricing Field Tests: 2006 Pilot Program Description and Results. Report. Jun. 19, 2007. 60 pages. LBNL Report No. 62218. Lawrence Berkeley National Laboratory. Berkeley, California.

(Continued)

*Primary Examiner* — Kidest Bahta
(74) *Attorney, Agent, or Firm* — Seager, Tufte & Wickhem, LLC

(57) ABSTRACT

A system and device that communicates critical resource information is described. The resource notification system comprises a resource distributor, a resource notification server, and a networked interface device. The resource distributor generates a demand response action that is associated with a particular resource. The resource distributor is also communicatively coupled to a wide area network. The resource notification server, which is also communicatively coupled to the wide area network, receives and processes the demand response action and generates a demand response event signal that is communicated to a customer list. The networked interface device comprises at least one indicator. The networked interface device receives the demand response event signal that triggers at least one indicator corresponding to the demand response action generated by the resource distributor, wherein the indicator provides a real-time indication that corresponds to the usage of the particular resource.

12 Claims, 8 Drawing Sheets

Resource Notification System

U.S. PATENT DOCUMENTS

| | | | |
|---|---|---|---|
| 7,392,115 | B2 | 6/2008 | Schindler |
| 7,528,503 | B2 | 5/2009 | Rognli et al. |
| 7,565,227 | B2 | 7/2009 | Richard et al. |
| 7,702,424 | B2 | 4/2010 | Cannon et al. |
| 7,797,009 | B2 * | 9/2010 | Kiiskila et al. ............... 455/519 |
| 7,845,576 | B2 | 12/2010 | Siddaramanna et al. |
| 2004/0034484 | A1 | 2/2004 | Solomita, Jr. et al. |
| 2005/0172304 | A1 * | 8/2005 | Tavares et al. ............... 719/318 |
| 2005/0194456 | A1 | 9/2005 | Tessier et al. |
| 2006/0047369 | A1 * | 3/2006 | Brewster et al. ............ 700/291 |
| 2008/0011864 | A1 | 1/2008 | Tessier et al. |
| 2009/0001180 | A1 | 1/2009 | Siddaramanna et al. |
| 2009/0001181 | A1 | 1/2009 | Siddaramanna et al. |
| 2009/0187499 | A1 | 7/2009 | Mulder et al. |
| 2009/0198384 | A1 | 8/2009 | Ahn |
| 2009/0204977 | A1 * | 8/2009 | Tavares et al. ............... 719/318 |
| 2009/0295594 | A1 | 12/2009 | Yoon |
| 2010/0168924 | A1 | 7/2010 | Tessier et al. |
| 2011/0016200 | A1 | 1/2011 | Koch |

FOREIGN PATENT DOCUMENTS

| | | |
|---|---|---|
| WO | WO 2009/020606 | 2/2009 |
| WO | WO 2009/023230 | 2/2009 |
| WO | WO 2009/085610 | 7/2009 |

OTHER PUBLICATIONS

Mary Ann Piette, David Watson, Naoya Motego, Sila Kiliccote and Peng Xu. Automated Critical Peak Pricing Field Tests: Program Description and Results. Report. Apr. 6, 2006. 56 pages. LBNL Report No. 59351. Lawrence Berkeley National Laboratory. Berkeley, California.

Mary Ann Piette, David S. Watson, Naoya Motegi and Sila Kiliccote. Participation through Automation: Fully Automated Critical Peak Pricing in Commercial Buildings. Report. 14 Pages. LBNL Report No. 60614. Lawrence Berkeley National Laboratory. Berkeley, California.

U.S. Appl. No. 13/019,943, filed Feb. 2, 2011.

Coughlin et al., "Estimating Demand Response Load Impacts: Evaluation of Baseline Load Models for Non-Residential Buildings in California," Lawrence Berkeley National Laboratory, Report No. LBNL-63728, 33 pages, Jan. 2008.

Kiliccote et al., "Open Automated Demand Response Communications in Demand Response for Wholesale Ancillary Services," Lawrence Berkeley National Laboratory, Report No. LBNL-2945E, 13 pages, Nov. 2009.

Koch et al., "Architecture Concepts and Technical Issues for an Open, Interoperable Automated Demand Response Infrastructure," Berkeley National Laboratory, Report No. LBNL-63664, 7 pages, Oct. 2007.

Koch et al., "Direct Versus Facility Centric Load Control for Automated Demand Response," Lawrence Berkeley National Laboratory, Report No. LBNL-2905E, 11 pages, Nov. 2009.

Koch et al., "Open Automated Demand Response for Small Commercial Buildings," Lawrence Berkeley National Laboratory, Report No. LBNL-2195E, 104 pages, Jul. 2009.

Koch et al., "Scenarios for Consuming Standardized Automated Demand Response Signals," Lawrence Berkeley National Laboratory, Report No. LBNL-1362E, 10 pages, Nov. 2008.

Piette et al., "Design and Implementation of an Open, Interoperable Automated Demand Response Infrastructure," Berkeley National Laboratory, Report No. LBNL-63665, 6 pages, Oct. 2007.

Piette et al., "Findings From Seven Years of Field Performance Data for Automated Demand Response in Commercial Buildings," Berkeley National Laboratory, Report No. LBNL-3643E, 15 pages, May 2010.

Piette et al., "Findings From the 2004 Fully Automated Demand Response Tests in Large Facilities," Lawrence Berkeley National Laboratory, Report No. LBNL-58178, 197 pages, Sep. 2005.

Piette et al., "Linking Continuous Energy Management and Open Automated Demand Response," Lawrence Berkeley National Laboratory, Report No. LBNL-1361E, 9 pages, Nov. 2008.

Piette et al., "Open Automated Demand Response Communications Specification," Version 1.0, CEC-500-2009-063, 214 pages, Apr. 2009.

Watson et al., "Machine to Machine (M2M) Technology in Demand Responsive Commercial Buildings," Berkeley National Laboratory, Report No. LBNL-55087, 18 pages, Aug. 2004.

Yin et al., "Auto-DR and Pre-Cooling of Buildings at Tri-City Corporate Center," Lawrence Berkeley National Laboratory, Report No. LBNL-3348, 140 pages, Nov. 2008.

* cited by examiner

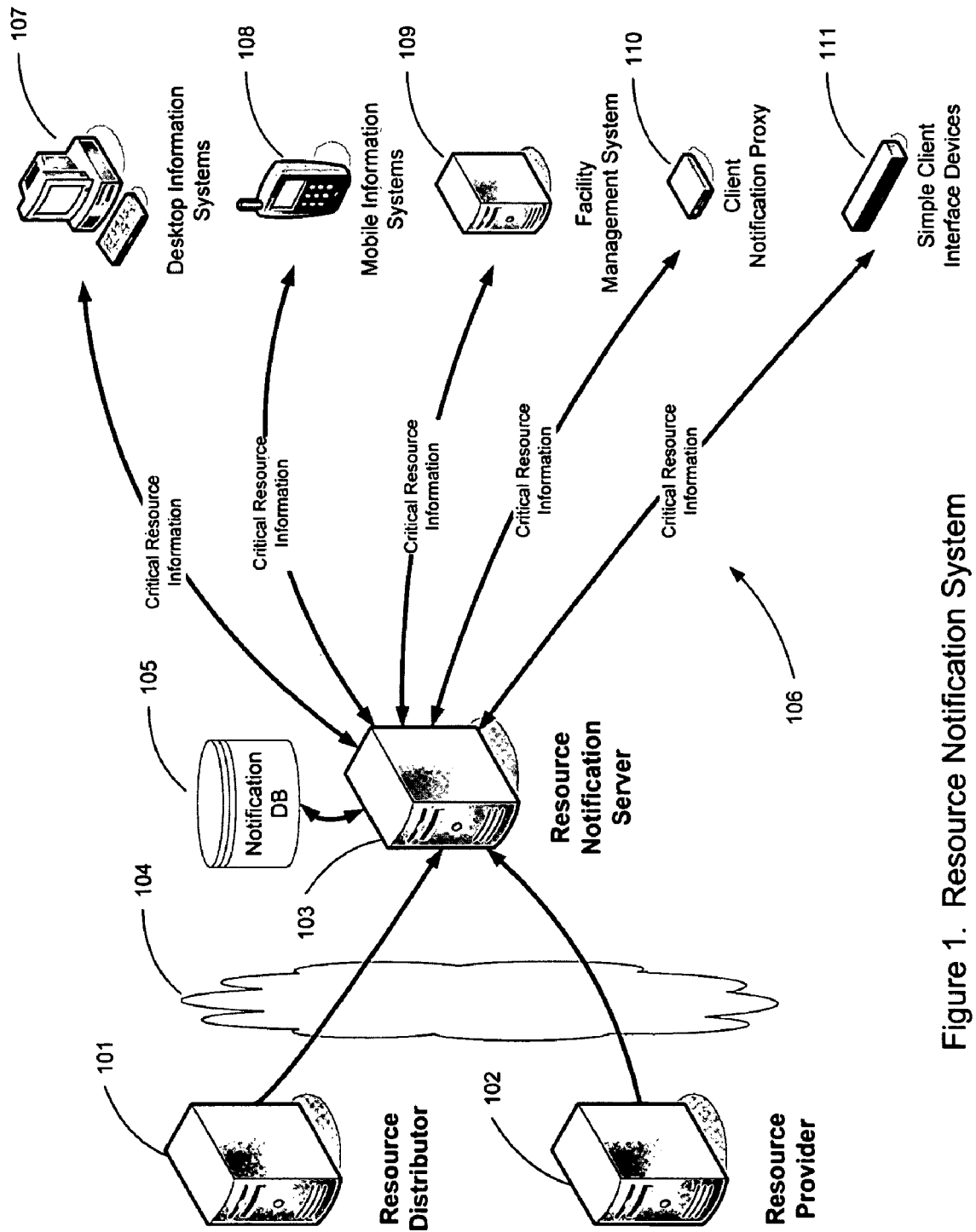
Figure 1. Resource Notification System

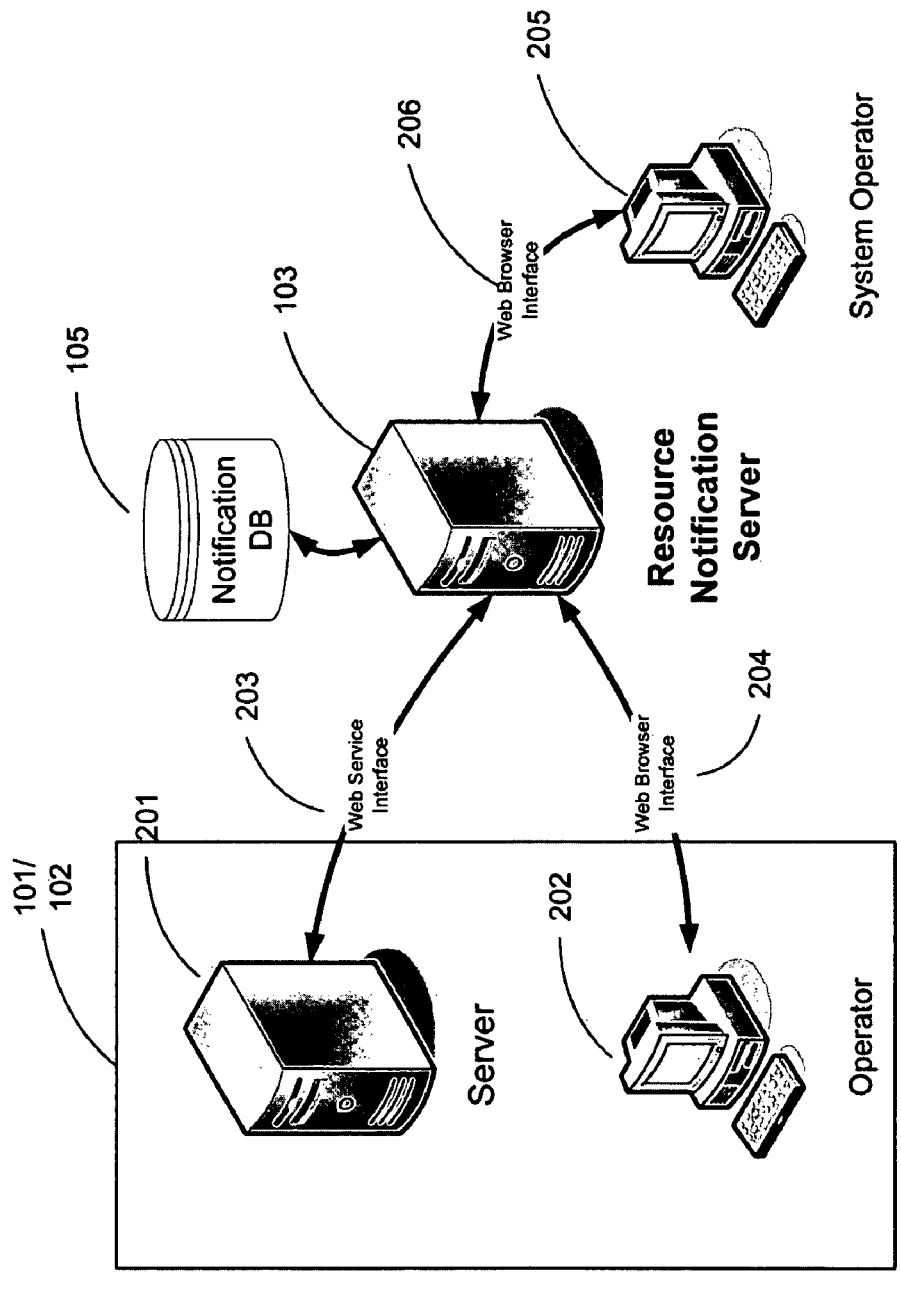
Figure 2. Resource Notification Server Operation

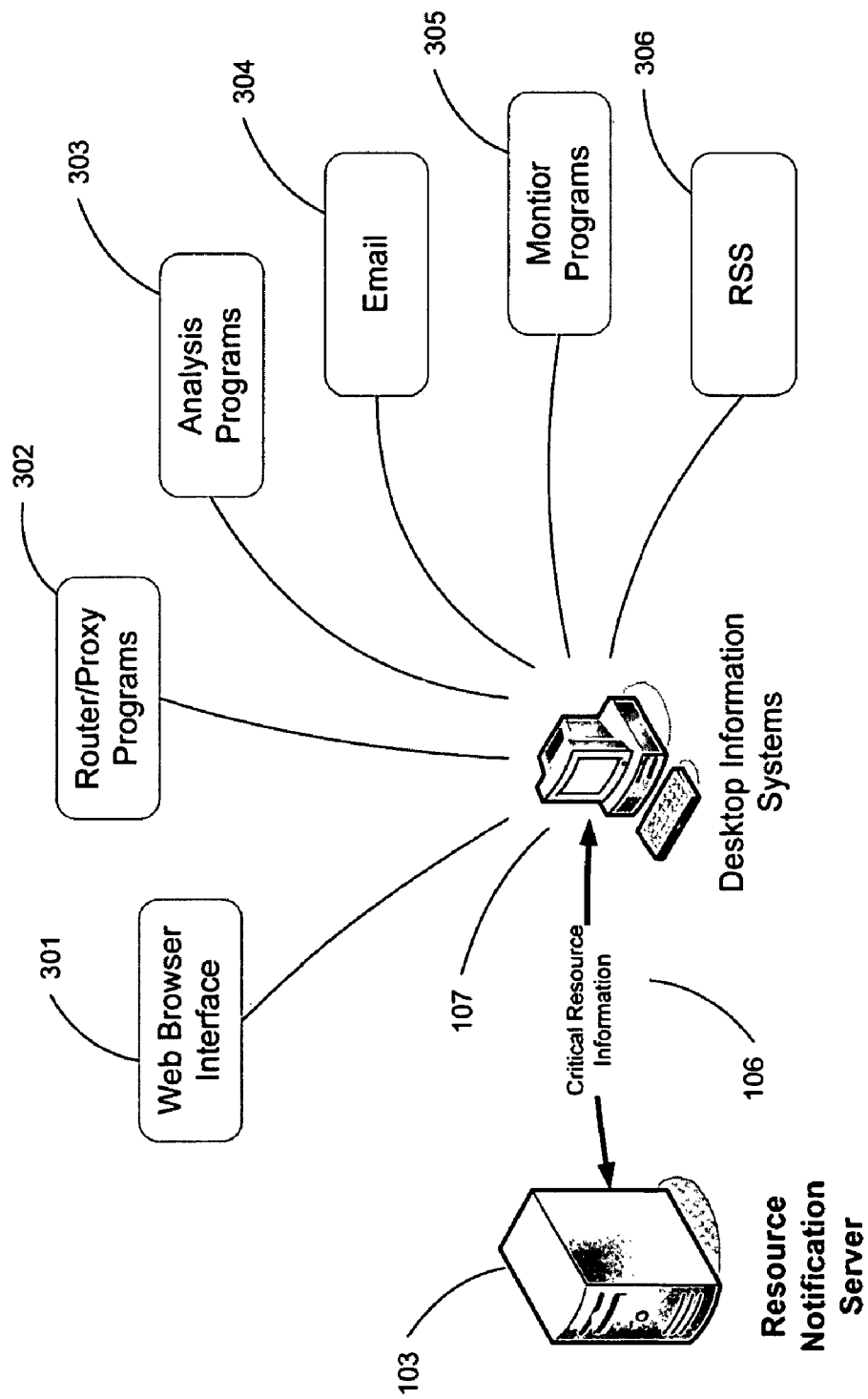
Figure 3. Desktop Information Systems

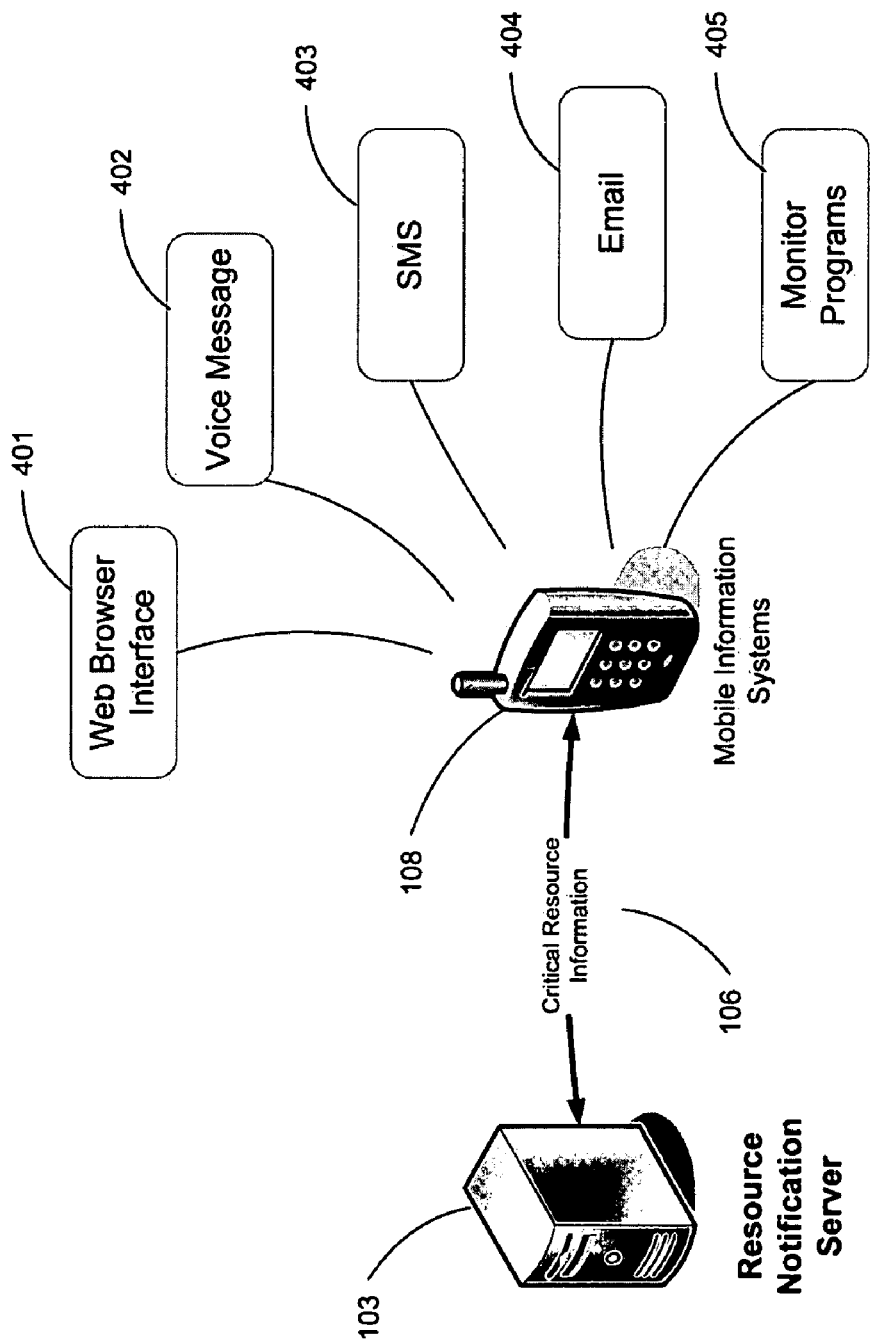
Figure 4. Mobile Information Systems

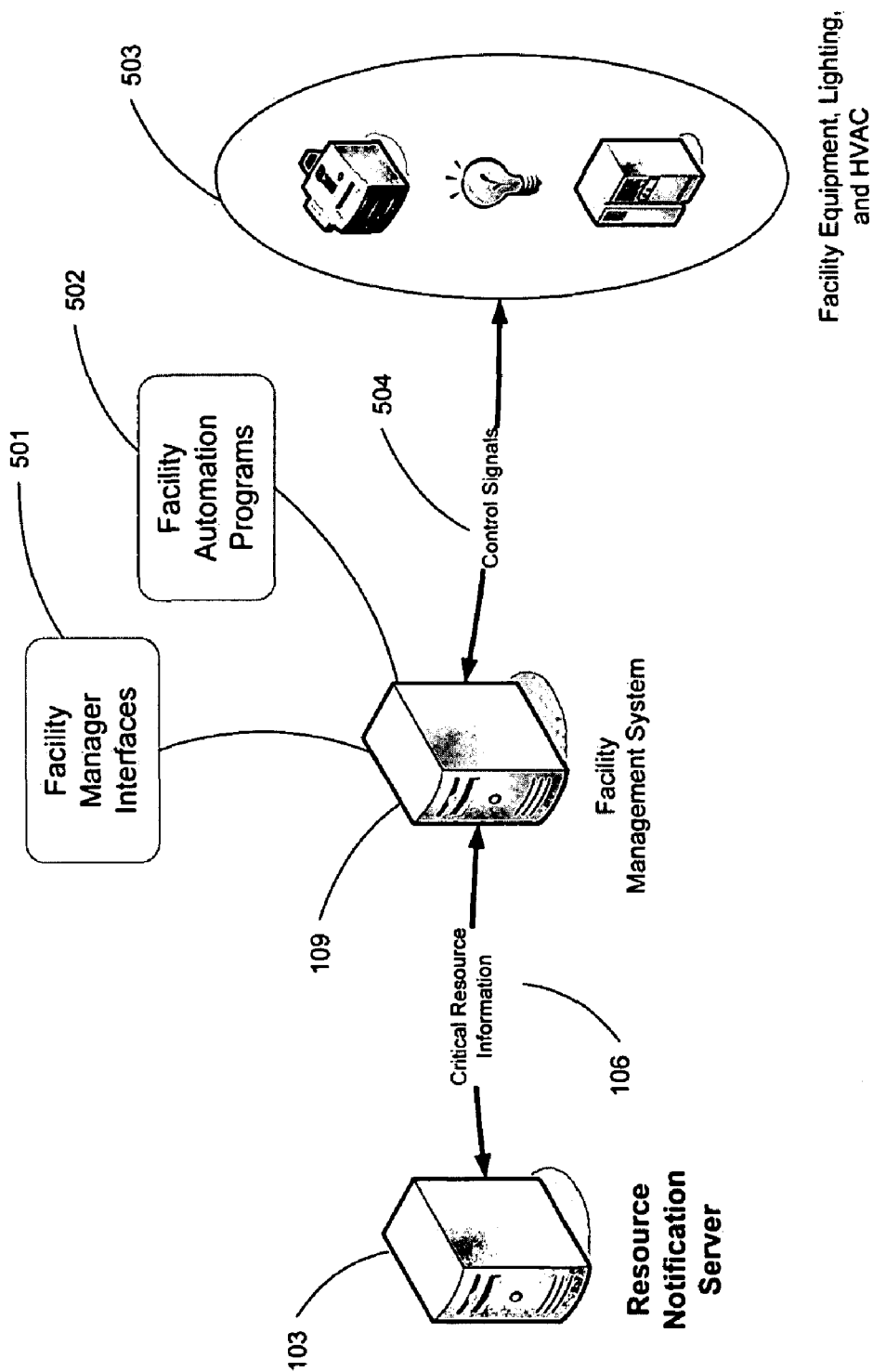
Figure 5. Facility Management Systems

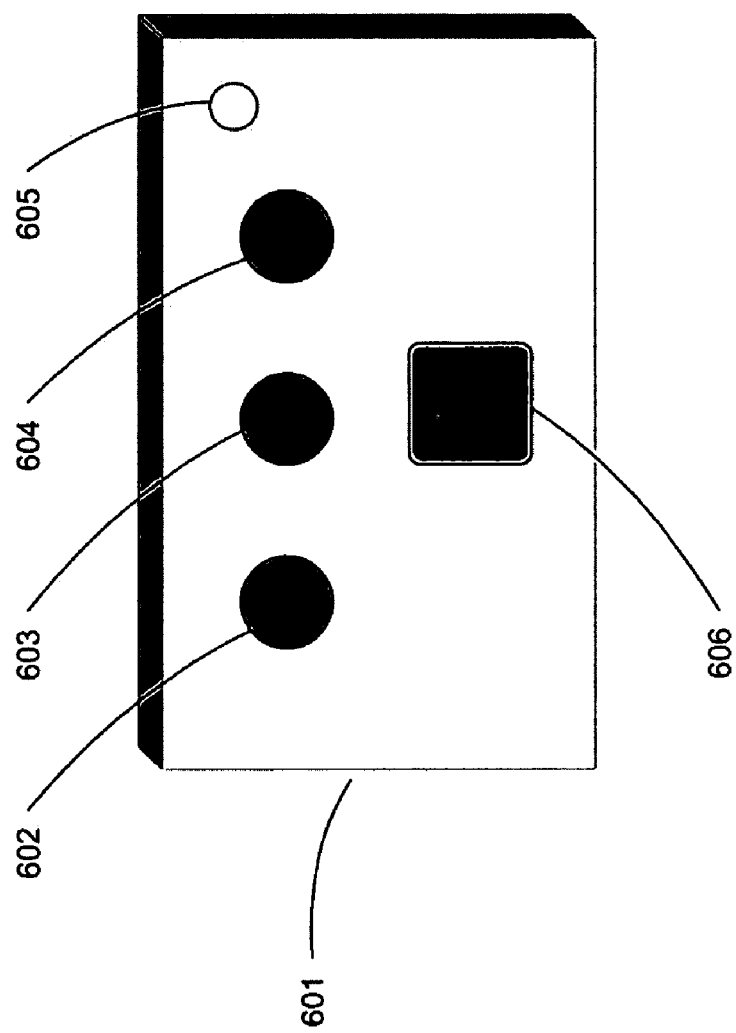
Figure 6. Example Simple Client Interface Device

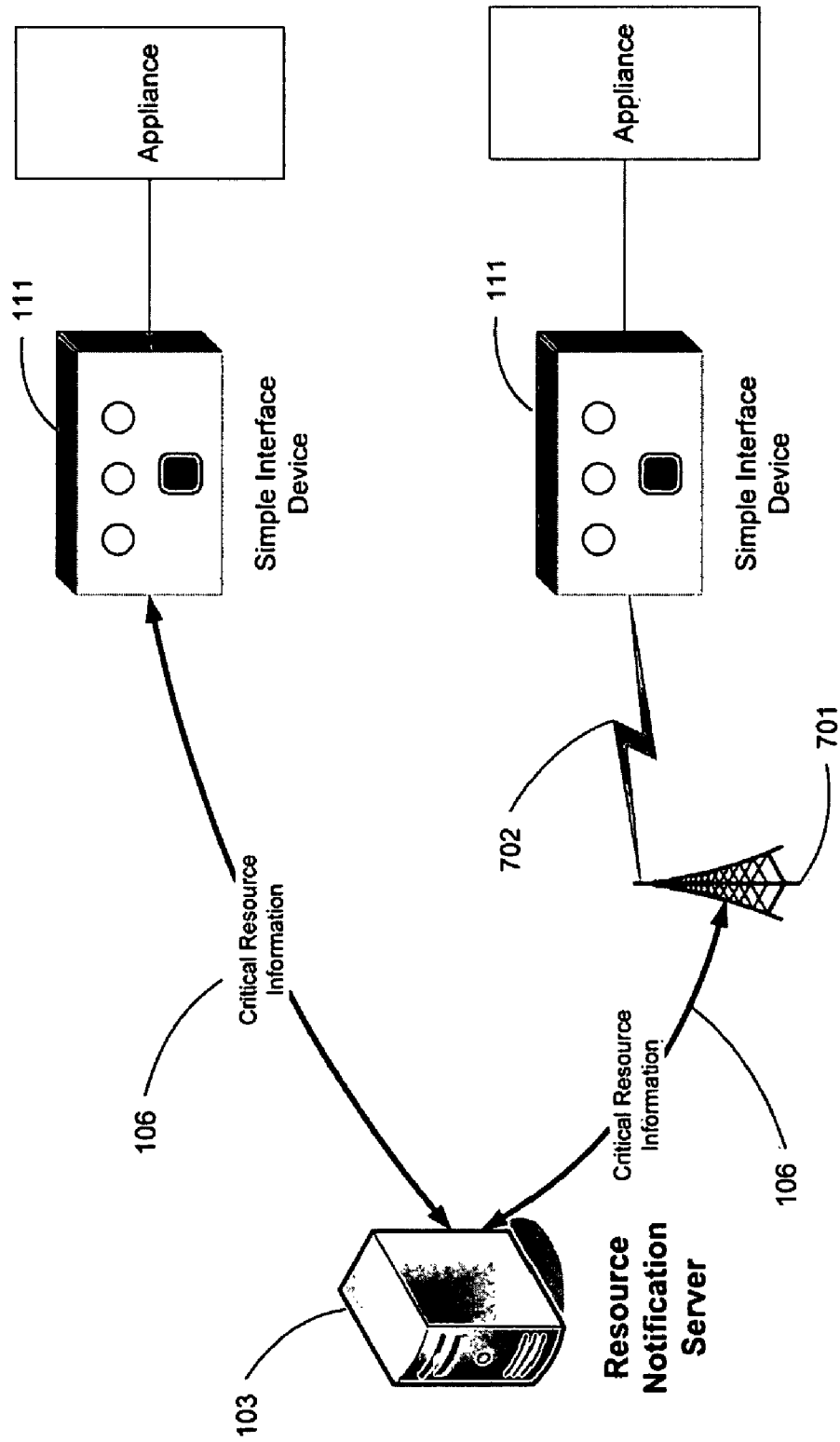
Figure 7. Simple Client Interface Devices

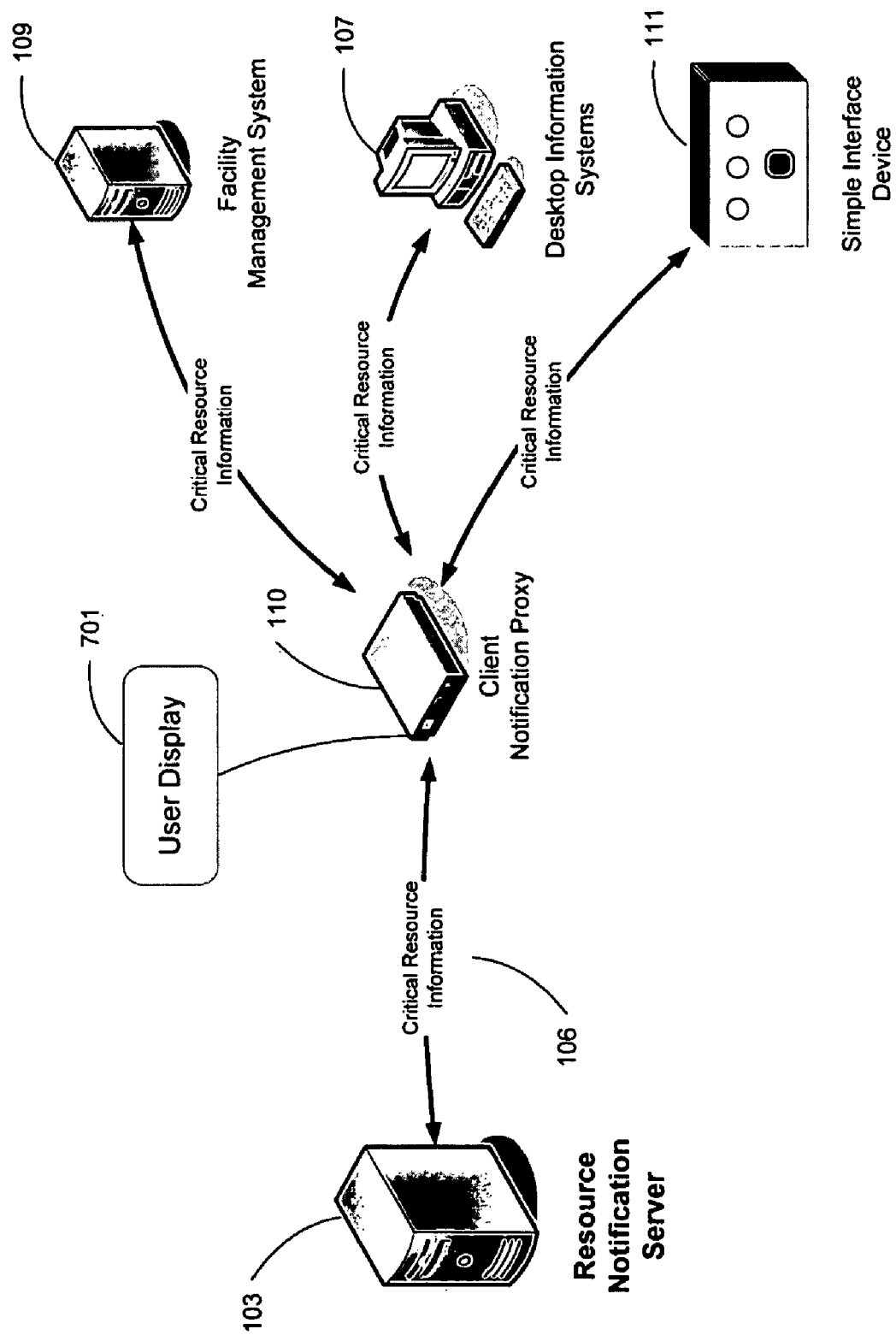
Figure 8. Client Notification Proxy

CRITICAL RESOURCE NOTIFICATION SYSTEM AND INTERFACE DEVICE

CROSS REFERENCE

This application is related to provisional application No. 60/977,909 filed on Oct. 5, 2007, which is hereby incorporated by reference.

FIELD OF THE INVENTION

This invention relates to a critical resource notification system and networked interface device. More particularly, the invention relates to a critical resource notification system and networked interface device for the distribution of resources including, but not limited to, electricity, water, and natural gas.

BACKGROUND

Effective resource management is especially critical when communities are confronted with a scarcity of the resource in question. Resources include electricity, water, gas and natural resources such as oil. The definition of resources may also be extended to include water quality and air quality, since adequate water quality and air quality are necessary to support a self-sustaining environment.

Resource management is necessary so that systems can optimize the use of a limited resource. Currently, there are various systems for managing resources in various environments such as buildings, apartments, industrial facilities, and computing systems. Regretfully, these solutions have not been extended to individuals or small businesses, which account for a substantial portion of each utility's customers.

For example, when the usage of a resource such as electricity becomes strained in response to supply conditions, the result may be a "rolling blackout." A rolling blackout refers to an intentionally engineered electrical power outage that is caused by insufficient electrical power resources to meet demand for electricity. In California, rolling blackouts are triggered by unusually hot temperatures that cause a surge in demand resulting in heavy use of air conditioning. There are three emergency stages that identify the severity of the problem. In a Stage 1 emergency, a general call for voluntary conservation is issued. A Stage 2 emergency results in power being temporarily cut off to certain large users that have agreed to this arrangement in exchange for lower rates. When a Stage 3 emergency is issued, electric to one of the fourteen California grids is shut off for a fixed period of time that can range from 60 minutes to 2½ hours. If after this period of time the Stage 3 emergency still exists, power is restored to this grid but then the next grid in the sequence is blacked out, and so on, until the situation is stabilized. Thus, the blackout "rolls" from one grid to the next.

In California, each customer's electric bill includes the number of the power grid (from 1 to 14) that customer belongs to; this gives customers at least some advance notice of when their electricity might be turned off in the event of a Stage 3 emergency. The grids are set up in such a manner as to ensure that a large percentage of customers in the same neighborhood would not be blacked out concurrently, which could invite looting and other related problems. Normal electricity customers can fall within the areas reserved for emergency use if they are near a hospital or other critical infrastructure, in which case their electricity bill will indicate a power grid of 99 and they will not be affected by rolling blackouts.

One mechanism that is used to encourage customers to reduce demand and thereby reduce the peak demand for electricity is referred to as demand response (DR). DR refers to a mechanism to manage the demand for customers in response to supply conditions. For example, electricity customers must reduce their consumption at critical times or in response to market prices.

In demand response applications, customers shed loads in response to a request by a utility or market price conditions. Services are reduced according to a preplanned load prioritization scheme during critical timeframes. An alternative to load shedding is on-site generation of electricity to supplement the power grid. Under conditions of tight electricity supply, demand response can significantly reduce the peak price and, in general, electricity price volatility.

Generally, demand response technologies detect the need for load shedding, communicate the demand to participating users, automate load shedding, and verify compliance with demand-response programs. These systems are complex and costly to implement because they rely on controlling the usage of the resource.

Thus, there is a need for a system and device that does not rely on controlling the usage of the resource, that is cost effective to implement, and that satisfies the goals of a demand response application.

SUMMARY

A system and device that communicates critical resource information is described. The resource notification system comprises a resource distributor, a resource notification server, and a networked interface device. The resource distributor generates a demand response action that is associated with a particular resource. The resource distributor is also communicatively coupled to a wide area network. The resource notification server, which is also communicatively coupled to the wide area network, receives and processes the demand response action and generates a demand response event signal that is communicated to a customer list. Each customer has an associated networked interface device. The networked interface device comprises at least one indicator that is operatively coupled to at least one appliance. The networked interface device receives the demand response event signal that triggers the indicator corresponding to the demand response action generated by the resource distributor, wherein the indicator provides a real-time indication that corresponds to the usage of the particular resource.

The networked interface device communicates critical resource information. The networked interface device comprises at least one indicator that provides a real-time indication that corresponds to the usage of a particular resource. Additionally, the networked interface device comprises a means for being communicatively coupled to a wide area network and communicating with the resource notification server that receives a demand response action from the resource distributor as described above. Furthermore, the networked interface device comprises a means for interfacing with an appliance. Further still, the networked interface device comprises a means for processing the demand response event signal that triggers the indicator corresponding to the demand response action generated by the resource distributor.

DRAWINGS

The present invention will be more fully understood by reference to the following drawings which are for illustrative, not limiting, purposes.

FIG. 1 shows an illustrative Resource Notification System.

FIG. 2 shows the illustrative operation of the Resource Notification System.

FIG. 3 shows an illustrative desktop information system that provides customer notification.

FIG. 4 shows an illustrative mobile information system that provides customer notification.

FIG. 5 shows an illustrative facility management system that provides customer notification.

FIG. 6 shows an illustrative networked interface device.

FIG. 7 shows the use of a networked interface device for customer notification.

FIG. 8 shows the use of a proxy device for customer notification.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems, and devices described hereinafter may vary as to configuration and as to details. Additionally, the methods may vary as to details, order of the actions, or other variations without departing from the illustrative method disclosed herein.

The solution described herein provides close integration of an automated system that allows both the utility and the customer to pre-program levels of demand, cost and processes. The solution supports changing configurations through a Web Service that can also monitor the dynamic process of the shed scenarios.

The system, device and methods can be used to send critical notification to customers concerning some resource they consume such as electricity, water, or natural gas. Customers are typically entities such as businesses or consumers that use and obtain some resource from a provider of that resource. Typically, the customer purchases the resource from the provider based upon an agreed upon rate. When either the price or availability of the resource changes in some critical fashion then it may become necessary for the providers of the resource to notify the customer of this change so that they can modify their use of the resource accordingly.

The system, device and methods described herein allow critical notification of the availability of a resource with the expectation that customers will reduce their consumption thus maintaining the availability of the resource. Examples include electricity usage where a small reduction of the energy load by the customers could result in the avoidance of so called rolling blackouts as described above.

Referring to FIG. 1 there is shown an illustrative resource notification system and its associated elements. The illustrative notification comprises a resource distributor 101 and resource provider 102 that are communicatively coupled to the resource notification server 103 via a wide area network 104. The wide area network may be the Internet, an Intranet, an Extranet, or any other such wide area network. By way of example and not of limitation the wide area network is the Internet and communications are performed using the TCP/IP protocol suite.

Typically, the resource distributor 101 is a utility company such as an electrical company, a water company, a gas company, or any other such utility company that manages a resource. For illustrative purposes only, the resource distributor 101 is an electric company. The resource provider 102 is a more inclusive term that includes private companies that sells or provides resources to the resource distributor 101. An illustrative resource provider 102 is a private company generating electricity from solar power sells the electricity to the utility company.

The resource notification server 103 has a corresponding notification database 105. The notification database 105 comprises a list of customers such as individuals or families living in apartments and houses, and "entities" such as workers operating in small businesses that lease office space. In general, the notification database 105 includes a list of utility customers that use or access some resource.

The resource notification server 103 provides an alert or notification regarding the resource to networked interface devices that are communicatively coupled to the resource notification server 103. In operation, the resource notification server 103 communicates critical resource information to each of the networked interface device. By way of example and not of limitation, the critical resource information includes notification that there is a severe change in demand for the particular resource that results in an inability to use the resource. The critical resource information may also includes communicate a significant change in demand for the particular resource that precedes the severe change in demand. Thus, critical resource information may include a notification that the price of electricity is going to increase 20% if the customer elects to continue using a particular appliance.

In the illustrative embodiment, the networked interface devices include a desktop information system 107, a mobile information system 108, a facility management system 109, a customer notification proxy 110, and simple customer interface device 111.

In operation, the resource distributor 101 or resource provider 102 sends a notification to the resource notification server 103 that indicates a "status" to resource notification server 103. The resource notification server 103 interprets the notification and generates price levels and demand response event signals are published as services to each of the networked interface devices.

In the illustrative embodiment, the resource notification server operates as a Web Service. A Web Service is a software system that is designed to support interoperable machine-to-machine interactions over a network. Generally, customers and servers communicate using XML messages that follow the Service Oriented Architecture Protocol (SOAP) standard. SOAP is an XML-based, extensible message envelope format, with bindings to underlying protocols. The primary protocols are HTTP and HTTPS, although bindings for other protocols shall be appreciated by those of ordinary skill in the art having the benefit of this disclosure.

Referring to FIG. 2 there is shown an illustrative operation of the resource notification server described above. The resource distributor 101 or 102 generates a demand response action or notification that is associated with a particular resource. A server 201 or operator 202 may generate the demand response action that is communicated via a Web Service Interface 203. The demand response action corresponds to a change in demand for a particular resource. In the illustrative embodiment, the Web Service Interface 203 is an XML interface with a predetermined mechanism that triggers the generation of the demand response action. The operator 202 may then proceed to confirm that the demand response action is the appropriate notification to be communicating to the resource notification server 104. By way of example and not of limitation, the operator 202 provides this confirmation using a web browser interface 204.

The resource notification server 103 that is also communicatively coupled to the wide area network receives and processes the demand response action and generates a demand response event signal that is communicated to a customer list that is extracted from the notification database 105. Each customer has an associated networked interface device as described in further detail below.

A system operator 205 manages the resource notification server 103 with a web browser interface 206. Depending on the particular application, the system operator 205 may operate remotely or may operate locally. Regardless, the web browser interface 206 provides a simple interface for the control of the resource notification server 103.

FIG. 3 shows an illustrative desktop information system that provides customer notification. The illustrative desktop information system 107 receives the critical resource information 106. The critical resource information 106 comprises a demand response event signal generated by the resource notification server 103. Thus, the demand response even signal is a subset of the critical resource information 106. The demand response event signal corresponds to a change in demand for the particular resource.

In operation, the desktop information system 107 interfaces with the resource notification server 103 using a web browser interface 301. The desktop information system 107 performs a variety of different tasks using router/proxy programs 302, analysis programs 303. Updates regarding the critical resource information are communicated using e-mail 304, monitoring programs 305, and RSS feeds 306.

For example, when a utility or Independent System Operator (ISO) predicts a spike in energy demand based on ambient temperature. The utility then proceeds to signal a change in cost using a bid program alert through demand response application server such as the resource notification server 103. The price-level and demand response event signals are transmitted to facilities and published as Web services. Polling customers having the appropriate CLIR and software request price-levels every minute. EMS and lighting control systems carry out a power demand shed. An interface to a Programmable Communicating Thermostat may accomplish this.

Referring to FIG. 4 there is shown an illustrative mobile information system that provides customer notification. The mobile information system 108 may receive a notification via a web browser 401, voice message 402, SMS 403, e-mail 403, monitoring programs 405, or other such notification means configured to be communicated to a mobile information system 108. The mobile information system may be Wi-Fi enabled, enabled to communicate using cellular frequency bands, or a combination thereof.

Referring to FIG. 5 there is shown an illustrative facility management system that provides customer notification. In this embodiment, the critical resource information is communicated from the resource notification server 103 to the facility management system 109. The facility management system includes a simple interface 501 and facility automation programs 502. The facility management system proceeds to generate control signals 504 that are communicated to facility equipment 503 that includes printers, lighting, server farms, refrigeration units, uninterruptible power supplies, and other such facility equipment.

The facility management system 109 provides a simple client interface that is used to control the facility equipment. For example, the facility management system 109 is configured to reduce power consumption by interfacing with the electrical controls in a building and providing pre-programmed routines to reduce the power load upon receipt of critical resource information.

Referring to FIG. 6 there is shown an illustrative networked interface device. The illustrative networked device 601 comprises at least one indicator. By way of example and not of limitation, a plurality of visible indicators are utilized in an appliance alert system. The networked interface device 601 communicates critical resource information such as a demand response action directly to the customer. The indicators for the networked interface device include visible, auditory, or audio-visual indicators that provide a real-time indication that corresponds to the usage of a particular resource.

The illustrative networked interface device 601 comprises a first visible indicator 602 that is shown as green, a second visible indicator 603 that is represented by a yellow color, and a third visible indicator 604 that is red, a fourth visible indicator 605 and a button 606. The illustrative button 606 is an on/off button and the fourth visible indicator 605 indicates that the networked device has network connectivity; so the visible indicator 605 may also blink at various frequencies and be solid to further indicate the degree or level of network connectivity that has been reached.

Additionally, the networked interface device 601 comprises a means for being communicatively coupled to a wide area network and communicating with the resource notification server that receives a demand response action from the resource distributor as described above.

Furthermore, the networked interface device 601 comprises a means for interfacing with an appliance. The appliance may be selected from a group of appliances consisting of an air conditioner, an oven, a heater, a refrigerator, a washer, a dryer, a range, a television, a computer, a water heater, a water cooler, a coffee maker, and a microwave.

Further still, the networked interface device 601 comprises a means for processing the demand response event signal that triggers at least one visible indicator corresponding to the demand response action generated by the resource distributor. In operation, the networked interface device 601 receives; the demand response event signal that triggers at least one visible indicator corresponding to the demand response action generated by the resource distributor. The visible indicator provides a real-time indication that corresponds to the usage of the particular resource.

For example, the red visible indicator 604 may communicate a severe change in demand for the particular resource that results in an inability to use the resource. More specifically, the red visible indicator 604 may indicate that use of the appliance is occurring during peak demand and shall result in a "brownout" or rolling blackout. Additionally the red visible indicator 604 may indicate that a severe price change shall take place such as a 15% increase in power for the next two-hour period. Thus, the red visible indicator 604 communicates to a customer that the use of the appliance is not recommended because the impact to the customer may be severe.

The yellow indicator 603 may communicate a significant change in demand for the particular resource. Typically, the yellow indicator 603 precedes the severe change in demand that is communicated with the red visible indicator 604. For example, the yellow indicator 603 indicates that there is currently a high energy demand, or that there is an increased cost differential, or a combination thereof. The illustrative green indicator 602 may communicate that electrical demand is low and that operation of the appliance does not affect the availability of the resource.

Referring to FIG. 7 there is shown two different embodiments of the networked interface device 111 for customer notification in communication with resource notification server 103. In the first embodiment, the networked interface device 111 communicates with a resource notification server 103 using a hard wired network connection such a telephone line, a cable, or any other such physical interface. In the second embodiment, the networked device 111 is communicatively coupled to the resource notification server 103 using a wireless communication technology 702. The wireless communication technology 702 includes, by way of example and not of limitation, CDMA, GSM or UMTS or any other wireless communication system such as Wi-Fi or WiMAX.

Referring to FIG. 8 there is shown the use of a proxy device for customer notification. The proxy device 110 includes a user display 701. Generally, the client notification proxy 110 is behind a firewall (not shown) and receives critical resource information 106 from the resource notification server 103. The critical resource information 106 is communicated via the client notification proxy 110 to the facility management system 109, desktop information system 107, and the networked interface device 111. The operations of the facility management system 109, desktop information system 107, and networked interface device have been described above.

In operation, the client notification proxy 110 is configured to communicate with the resource notification server 103 over the wide area network. The client notification proxy 110 then communicates the critical resource information to devices and systems that are in within its' local area network. The client notification proxy 110 may operate within a small commercial enterprise or residence.

It is to be understood that the detailed description of illustrative embodiments are provided for illustrative purposes. The scope of the claims is not limited to these specific embodiments or examples. For example, a networked interface device 111 has been described, however this solution may be extended to any source electronic device having the properties of the networked interface device described herein. Therefore, various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A resource notification system that communicates critical resource information, the resource notification system comprising:
   a resource distributor communicatively coupled to a wide area network, the resource distributor configured to generate a demand response action for a particular resource;
   a resource notification server communicatively coupled to the wide area network, the resource notification server configured to process the demand response action and generate a demand response event signal that is communicated to a customer list; and
   at least one networked interface device associated with each customer in the customer list, the networked interface device comprising at least one indicator, the networked interface device configured to receive the demand response event signal that triggers at least one indicator corresponding to the demand response action generated by the resource distributor, wherein the indicator provides a real-time indication that corresponds to the usage of the particular resource.

2. The resource notification system of claim 1 wherein the demand response action and the demand response event signal corresponds to a change in demand for the particular resource.

3. The resource notification system of claim 2 wherein the indicator associated with the networked interface device further comprises:
   a first indicator that communicates a severe change in demand for the particular resource that results an inability to use the resource; and
   a second indicator that communicates a significant change in demand for the particular resource that precedes the severe change in demand.

4. The resource notification system of claim 3 wherein the wide area network is the Internet and the communications between the resource distributor, the resource notification server, and the networked interface device are performed using the TCP/IP protocol suite.

5. The resource notification system of claim 4 wherein the demand response action and the demand response event signal corresponds to a change in price for the particular resource.

6. The resource notification system of claim 5 wherein the particular resource is power and the demand response action is related to peak demand.

7. A networked interface device that communicates critical resource information, the networked interface device comprising:
   at least one indicator that provides a real-time indication that corresponds to the usage of a particular resource;
   a means for being communicatively coupled to a wide area network and communicating with a resource notification server that receives a demand response action from a resource distributor, the resource notification server configured to process the demand response action and generate a demand response event signal that is communicated to a customer list;
   a means for interfacing with an appliance; and
   a means for processing the demand response event signal that triggers the at least one indicator corresponding to the demand response action generated by the resource distributor.

8. The networked interface device of claim 7 wherein the demand response action and the demand response event signal corresponds to a change in demand for the particular resource.

9. The networked interface device of claim 8 wherein the indicator associated with the networked interface device further comprises:
   a first indicator that communicates a severe change in demand for the particular resource that results an inability to use the resource; and
   a second indicator that communicates a significant change in demand for the particular resource that precedes the severe change in demand.

10. The networked interface device of claim 9 wherein the wide area network is the Internet and the communications between the resource distributor, the resource notification server, and the networked interface device are performed using the TCP/IP protocol suite.

11. The networked interface device of claim 10 wherein the demand response action and the demand response event signal corresponds to a change in price for the particular resource.

12. The networked interface device of claim 11 wherein the particular resource is power and the demand response action is related to peak demand.

* * * * *